United States Patent Office 3,423,173
Patented Jan. 21, 1969

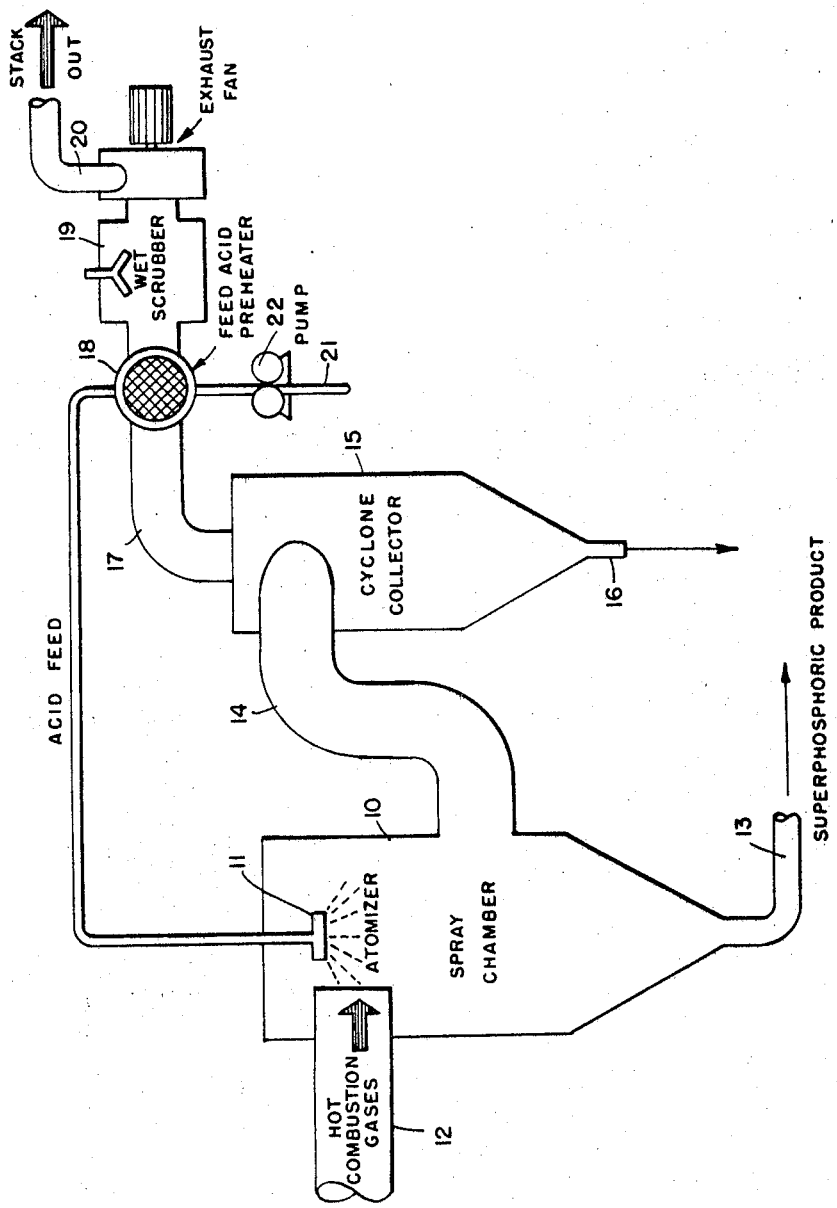

3,423,173
SPRAY CONCENTRATION OF WET PROCESS ORTHOPHOSPHORIC ACID TO POLYPHOSPHORIC ACID
Richard F. McFarlin, Atlanta, Ga., and William A. Satterwhite, Lakeland, Fla., assignors, by mesne assignments, to Armour Agricultural Chemical Company, a corporation of Delaware
Filed Dec. 8, 1965, Ser. No. 512,410
U.S. Cl. 23—165                              4 Claims
Int. Cl. C01b 25/18; B01d 1/16

ABSTRACT OF THE DISCLOSURE

Wet process orthophosphoric acid containing about 1–15 percent of metal impurities is concentrated to polyphosphoric acid by spray atomizing the orthophosphoric acid into fine droplets and contacting the droplets in a dehydrating zone with hot products of combustion to raise the temperature of the acid droplets to about 420–600° F., the gases and evolved vapors being withdrawn, and polyphosphoric acid having about 20–80 percent thereof in the non-ortho form is recovered as product.

---

This invention relates to spray concentration of wet process orthophosphoric acid to polyphosphoric acid, and the process is particularly useful in the preparation of high analysis $P_2O_5$ phosphoric acids, such as superphosphoric acid and higher analysis acids.

Wet process orthophosphoric acid usually contains a substantial amount of metal impurities ranging from about 1 to 15 percent and including aluminum, magnesium, iron, and other metal oxides. In the process of concentrating such acid to superphosphoric acid, a substantial amount of solids in the form of salts of such metals, etc. is formed, and such solids present a serious problem in the concentration processes. Further, some of the solids are citrate insoluble and lose their value as fertilizer ingredients.

In the usual concentration procedure, the wet process orthophosphoric acid is concentrated by contact with hot combustion gases which are delivered through a submerged dip pipe, and deposits of the solids on the end of the dip pipe limit the effectiveness of the concentration procedure, cause irregular back pressures, and present other difficulties. Relatively large operating equipment is required and relatively high liquid temperatures have to be maintained. Further, the non-orthophosphoric acid formed in the process is relatively low. Other processes use steam tubes and falling film heat exchangers wherein evaporation occurs on a metal surface. Long exposure is required. The metal surfaces, tubes, or sheets coat with solids and frequently cause operational failures. Also, these processes are even more restricted to production of low non-orthophosphate values.

A second major problem inherent in the hot gas process is the difficulties in handling and entrainment losses resulting from foaming of the acid. The contacting of a minute droplet of acid with combustion gases in the spray concentration process affords almost infinite volume for the sudden expansion of carbonates, fluorides, etc., to a gaseous phase. The instantaneous release of gases from the liquid avoids conditions which produce foaming.

We have discovered that by employing spray concentration of wet process phosphoric acid to form polyphosphoric acid, less solids are formed in the concentration procedure, smaller operating equipment may be employed, and lower temperatures are effective in obtaining the higher $P_2O_5$ content of the acid product. Further, such concentration procedure brings about a higher concentration of non-orthophosphoric acid at a lower $P_2O_5$ level. Since there is negligible solids build-up in the evaporator chamber, the process can be carried on with lower maintenance cost.

A primary object, therefore, of the invention is to provide a process for concentrating wet process orthophosphoric acid to polyphosphoric acid with less solids build-up and at lower relative temperatures. A further object is to prepare superphosphoric acid with a higher concentration of non-orthophosphoric acid through the contact of finely-divided orthophosphoric acid with combustion gases. A still further object is to prepare high analysis $P_2O_5$ polyphosphoric acid by recycling concentrated acids and spray atomizing the same for contact with hot combustion gases. Other specific objects and advantages will appear as the specification proceeds.

The invention is shown, in an illustrative embodiment, by the accompanying drawing, in which apparatus in which the process may be employed is diagrammatically set out.

In one embodiment of our invention, wet process orthophosphoric acid is instantly concentrated to superphosphoric acid by spray atomization of the orthophosphoric acid into a dehydrating chamber and in contact with a stream of hot combustion gases. We prefer to spray atomize the acid into the upper portion of the conical chamber and to introduce hot combustion gases also into the upper portion of the chamber and to pass the mixture cocurrently downwardly through the chamber. Best results are obtained when the hot combustion gases are brought into the chamber tangentially, thus creating a swirl or rotating flow pattern for the gas and finely-dispersed acid mist. Water in the acid is removed in a few seconds and at a low temperature due to the intimate contact of hot gas and acid. The bulk of the acid collects on the walls of the chamber and flows downwardly to discharge at the bottom of the cone.

In the illustration given, 10 designates a dehydration chamber having a cone bottom. Acid is discharged into the upper portion of the chamber through the atomizer 11. Hot gases are discharged through a pipe 12 which is preferably tangentially arranged with respect to chamber 10 so as to rotate the acid droplets and the gas within the spray chamber. Superphosphoric acid is withdrawn through the outlet 13. The evolved vapors and the combustion gases are withdrawn through the duct 14 and delivered tangentially into a separator 15. A small fraction of the acid thus carried over to the separator 15 is recovered and discharged through the outlet 16 and drained to a common product receiver. The hot exhaust gas stream from the cyclone separator or collector 15 passes outwardly through the duct 17 and through a heat exchanger 18 where the hot combustion gases are partially cooled by contact with incoming feed acid. From the heat exchanger, the gases pass to a scrubber 19 where they are scrubbed with water and then are exhausted through outlet 20 to the atmosphere.

In the foregoing process, feed orthophosphoric acid is passed through pipe 21 by pump 22 and thence through heat exchanger 18 where the feed acid is preheated.

When it is desired to increase the $P_2O_5$ content of the final product, the feed pipe 21 may be extended to the product receiver for recycling the product which has accumulated therein from the outlets 13 and 16.

In the spray concentration of wet process orthophosphoric acid to polyphosphoric acid, the feed acid after being spray atomized may be contacted with hot combustion gases in any desired manner, as, for example, in cocurrent, countercurrent, etc. relation, the temperatures being maintained at a sufficiently high range to bring about the concentration of the orthophosphoric acid to polyphosphoric acid with a conversion of the ortho to the non-ortho form of from 25 to 80% and more. The acid is exposed to high temperatures for a matter of seconds rather than for several minutes or more employed in conventional processes, and due to the intimate contact of the fine droplets with hot gases, it is found that lower temperatures may be employed than those heretofore required in submerged combustion processes for concentrating the acid to superphosphoric acid. Higher concentrations of non-orthophosphoric acid are achieved at lower $P_2O_5$ levels, due again to fine droplet contact with the hot gases.

We prefer to employ a spray concentrator temperature of about 420–600° F., best results being obtained in the range of about 450–550° F. The hot combustion gases are preferably introduced into the dehydrator chamber at temperatures of about 800–1200° F., our preferred range being 900–1100° F. As stated, the rate of feed and the temperature of the hot combustion gases are regulated to bring about a liquid exit or spray temperature of about 420–600° F.

A polyphosphoric acid product having greater than 80% thereof in the non-ortho form is obtained by recycling polyphosphoric acid recovered in the first conversion operation and again introducing such acid in spray atomized condition and tangentially into the dehydrating zone where the hot products of combustion are preferably at a temperature of about 1000–1500° F. to rotate the polyphosphoric acid in said zone and to raise the temperature of the acid to about 600–750° F., the gases being separately withdrawn and the polyphosphoric acid being separately recovered. If desired, the recycled polyphosphoric acid product from the first operation may be mixed with orthophosphoric acid feed in any desired proportion and the mixture concentrated as above described, as by spray atomizing and introducing the resulting fine droplets tangentially into the dehydrating zone at temperatures of about 1000–1500° F. to rotate the mixture and to raise the temperature of the mixed acids to about 600–750° F. The combustion gases are withdrawn and the polyphosphoric acid is separately recovered with a non-ortho content in excess of 80%.

POLYPHOSPHORIC ACID RECYCLE WITH ORTHOPHOSPHORIC ACID

| Feed conc. Ortho acid, $P_2O_5$, percent | percent of $P_2O_5$ in feed | Poly acid recycle | | Poly acid product | |
|---|---|---|---|---|---|
| | | Acid conc. $P_2O_5$, percent | Percent of $P_2O_5$ in feed | $P_2O_5$, percent | $P_2O_5$ as polyphosphate, percent |
| 54 | 100 | 0 | 0 | 68–74 | 40–65 |
| 60 | 64 | 75 | 36 | 74–76 | 80 |
| 64 | 48 | 77 | 52 | 76–78 | 85 |
| 68 | 35 | 79 | 65 | 78–80 | 90 |

Specific examples illustrative of our process may be set out as follows:

EXAMPLE I

A wet process 54 percent $P_2O_5$ feed acid was passed through a Bowen SW-type atomizing nozzle into a spray chamber as shown in the drawing. The feed acid had a $P_2O_5$ content of 54.26 percent, an aluminum oxide content of 1.37 percent, an iron oxide content of 0.58 percent, a magnesium oxide content of 0.44 percent, and a solids content of 1.38 percent. The hot combustion gases, formed by the oxidation of propane, were diluted with cool air to an inlet temperature of 940° F. The feed rate of the acid was 300 cubic centimeters per minute. The liquid outlet temperature was 450° F. The inlet gases were allowed to adjust to the feed rate, holding a constant outlet temperature of 450° F. The product had a $P_2O_5$ content of 68.0 percent and there were no solids.

EXAMPLE II

This process was carried out as described in Example I except that the outlet temperature was raised to 475° F. The evaporator was brought up to temperature using water in order to keep the walls cool, and upon reaching the desired outlet temperature of 475° F. the feed acid replaced the water. The inlet temperature of the combustion gases was about 917° F. and the feed rate was 135 cubic centimeters per minute. The product had a $P_2O_5$ equivalent content of 70.2 and contained no solids.

EXAMPLE III

This run was very much the same as in Example I except that the inlet temperature of the combustion gases was raised to 1000° F. and the liquid outlet temperature was about 500° F. The feed rate was 80 cubic centimeters per minute. The product had a $P_2O_5$ equivalent content of 72.2 percent and a content of solids of 0.1 percent.

EXAMPLE IV

This run was made using the product produced from Example II and as illustrating the recycling of the product. The outlet temperature was held at 545–560° F., and the final product had a $P_2O_5$ equivalent content of 74.2 weight percent, with a solids content of 0.1 percent.

EXAMPLE V

Feed acid as described in Example I was atomized in the form of fine droplets within chamber 10, as shown in the drawing, and hot combustion gases at a temperature of 1000° F. were introduced tangentially to form a swirling mass of acid droplets and gas, the outlet temperature being 500° F. The feed acid was passed through a heat exchanger before being atomized. The final product had a $P_2O_5$ equivalent content of 73.56 weight percent, with a solids content of 0.28 percent.

EXAMPLE VI

Comparative tests were made of wet process orthophosphoric acid of the character described in Example I, using the process as described herein in comparison with conventional submerged combustion procedures, and such tests wherein the acid was concentrated to a specific high $P_2O_5$ content gave the following results:

TABLE I

| $P_2O_5$ level, percent | Submerged combustion temp., ° F. | Spray concentrator temp., ° F. |
|---|---|---|
| 68 | 525 | 450 |
| 70 | 550 | 475 |
| 72 | 580 | 500 |
| 74 | 610 | 550 |

Due to the more intimate contact of fine droplets with hot gases, lower temperatures are required, as shown by the above.

EXAMPLE VII

Comparative tests as carried on in Example VI also demonstrated that higher concentrations of non-orthophosphoric acid are achieved at lower $P_2O_5$ level, due again to fine droplet contact with hot gases, as shown by the following table:

TABLE II

| $P_2O_5$ level, percent | Submerged combustion non-ortho, percent | Spray concentrator non-ortho, percent |
|---|---|---|
| 68 | 10 | 25 |
| 70 | 20 | 50 |
| 72 | 50 | 65 |
| 74 | 65 | 80 |

While in the foregoing specification we have set out specific procedures in considerable detail for the purpose of illustrating embodiments of our invention, it will be understood that such details may be varied widely by those skilled in the art without departing from the spirit of our invention.

We claim:
1. In a process for concentrating wet process orthophosphoric acid to polyphosphoric acid, the steps of spray atomizing wet process orthophosphoric acid con- taining 1–15 percent of metal impurities into fine droplets of acid, contacting said droplets in a dehydrating zone with hot products of combustion at about 800–1200° F. to raise the temperature of the acid droplets to about 420–600° F., withdrawing said gases and the evolved vapors, and separately recovering polyphosphoric with substantially 20–80 percent thereof in the non-ortho form.

2. In a process for concentrating wet process orthophosphoric acid to polyphosphoric acid, the steps of spray atomizing orthophosphoric acid in a dehydrating zone, introducing hot products of combustion at about 800–1200° F. into said dehydrating zone to rotate the acid therein and to raise the temperature of the acid to about 420–600° F., withdrawing said gases, passing said orthophosphoric acid prior to being atomized in heat exchange relation with said withdrawn gases to pre-heat said orthophosphoric acid, and separately recovering from said dehydrating zone polyphosphoric acid having about 25–80% thereof in the non-ortho form.

3. The process of claim 2 in which said recovered polyphosphoric acid is recycled and again spray atomized and introduced tangentially into said dehydrating zone at temperatures of about 1000–1500° F. to rotate said polyphosphoric acid therein and to raise the temperature of the acid to about 600–750° F., said gases being withdrawn and the polyphosphoric acid product being withdrawn with greater than 80% of the acid in non-ortho form.

4. The process of claim 2 in which the recovered polyphosphoric acid is mixed with orthophosphoric acid and the mixture spray atomized and introduced tangentially into said dehydrating zone at about 1000–1500° F. to rotate said polyphosphoric acid and orthophosphoric acid mixture and to raise the temperature thereof to about 600–750° F., said gases being withdrawn and the polyphosphoric acid product being recovered with greater than 80% thereof in non-ortho form.

References Cited
UNITED STATES PATENTS

| 2,314,159 | 3/1943 | Peebles | 159—4 |
| 3,113,063 | 12/1963 | Lanham | 23—165 |
| 3,192,013 | 6/1965 | Young | 23—165 |

OSCAR R. VERTIZ, *Primary Examiner.*

ARTHUR J. GREIF, *Assistant Examiner.*

U.S. Cl. X.R.

159—48